(12) United States Patent
Taylor

(10) Patent No.: US 9,392,338 B2
(45) Date of Patent: *Jul. 12, 2016

(54) APPARATUS, SYSTEMS AND METHODS TO COMMUNICATE AUTHORIZED PROGRAMMING BETWEEN A RECEIVING DEVICE AND A MOBILE DEVICE

(71) Applicant: Echostar Technologies L.L.C., Englewood, CO (US)

(72) Inventor: Thomas S. Taylor, Atlanta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 585 days.

This patent is subject to a terminal disclaimer.

(21) Appl. No.: 13/891,596

(22) Filed: May 10, 2013

(65) Prior Publication Data
US 2013/0268959 A1  Oct. 10, 2013

Related U.S. Application Data

(63) Continuation of application No. 13/439,699, filed on Apr. 4, 2012, now Pat. No. 8,452,261, which is a continuation of application No. 11/950,803, filed on Dec. 5, 2007, now Pat. No. 8,175,579.

(51) Int. Cl.
*H04N 21/6334* (2011.01)
*H04L 29/06* (2006.01)

(52) U.S. Cl.
CPC ........ *H04N 21/6334* (2013.01); *H04L 63/0807* (2013.01); *H04L 63/102* (2013.01); *H04L 63/18* (2013.01); *H04L 2463/101* (2013.01)

(58) Field of Classification Search
CPC ........................ H04L 2463/101; H04L 63/102
USPC ............... 455/411, 419, 515, 3.01, 410, 3.06, 455/414.1
See application file for complete search history.

(56) References Cited

U.S. PATENT DOCUMENTS

| | | | |
|---|---|---|---|
| 2006/0274717 A1 | 12/2006 | Merkle et al. | |
| 2007/0097860 A1* | 5/2007 | Rys | H04L 63/10 370/229 |
| 2007/0192837 A1 | 8/2007 | Lee et al. | |
| 2009/0217036 A1* | 8/2009 | Irwin | G06F 21/10 713/168 |
| 2010/0031366 A1* | 2/2010 | Knight | G06Q 10/10 726/26 |

* cited by examiner

*Primary Examiner* — John J Lee
(74) *Attorney, Agent, or Firm* — Seed IP Law Group PLLC

(57) ABSTRACT

A mobile device embodiment communicates program distribution account information to a program distributor. The mobile device embodiment receives from the program distributor, authorization to use programming that is conditioned on the communicated program distribution account information. The mobile device embodiment communicates the authorization to a receiving device.

20 Claims, 4 Drawing Sheets

APPARATUS, SYSTEMS AND METHODS TO COMMUNICATE AUTHORIZED PROGRAMMING BETWEEN A RECEIVING DEVICE AND A MOBILE DEVICE

CROSS-REFERENCE TO RELATED APPLICATION

This application is a continuation of U.S. patent application Ser. No. 13/439,699, filed Apr. 4, 2012, now allowed, which is a continuation of U.S. patent application Ser. No. 11/950,803, filed Dec. 5, 2007, now U.S. Pat. No. 8,175,579, which applications are incorporated herein by reference in their entirety.

TECHNICAL FIELD

The technical field relates to systems and methods for communicating programming and, more particularly, to apparatus, systems, and methods to communicate authorized programming between a receiving device and a mobile device.

BRIEF SUMMARY

Apparatus, systems, and methods for communicating programming are disclosed. According to one embodiment, a method includes communicating program distribution account information to a program distributor via a mobile device, receiving at the mobile device, from the program distributor, authorization to use programming, the authorization conditioned on the communicated program distribution account information, and storing the programming in a memory in the mobile device.

According to yet another embodiment, a mobile device has a processing system, a memory coupled to the processing system, the memory operable to store program distribution account information, a first communication interface operable to communicate the program distribution account information to the program distributor and further operable to receive an authorization from the program distributor, and a second communication interface operable to communicate the authorization to a receiving device.

According to another embodiment, a receiving device operable to communicate with mobile devices includes a first interface operable to receive from a mobile device, authorization to use authorized programming, a programming interface operable to receive the authorized programming from a program distributor, and a second interface operable to communicate the authorized programming to the mobile device.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
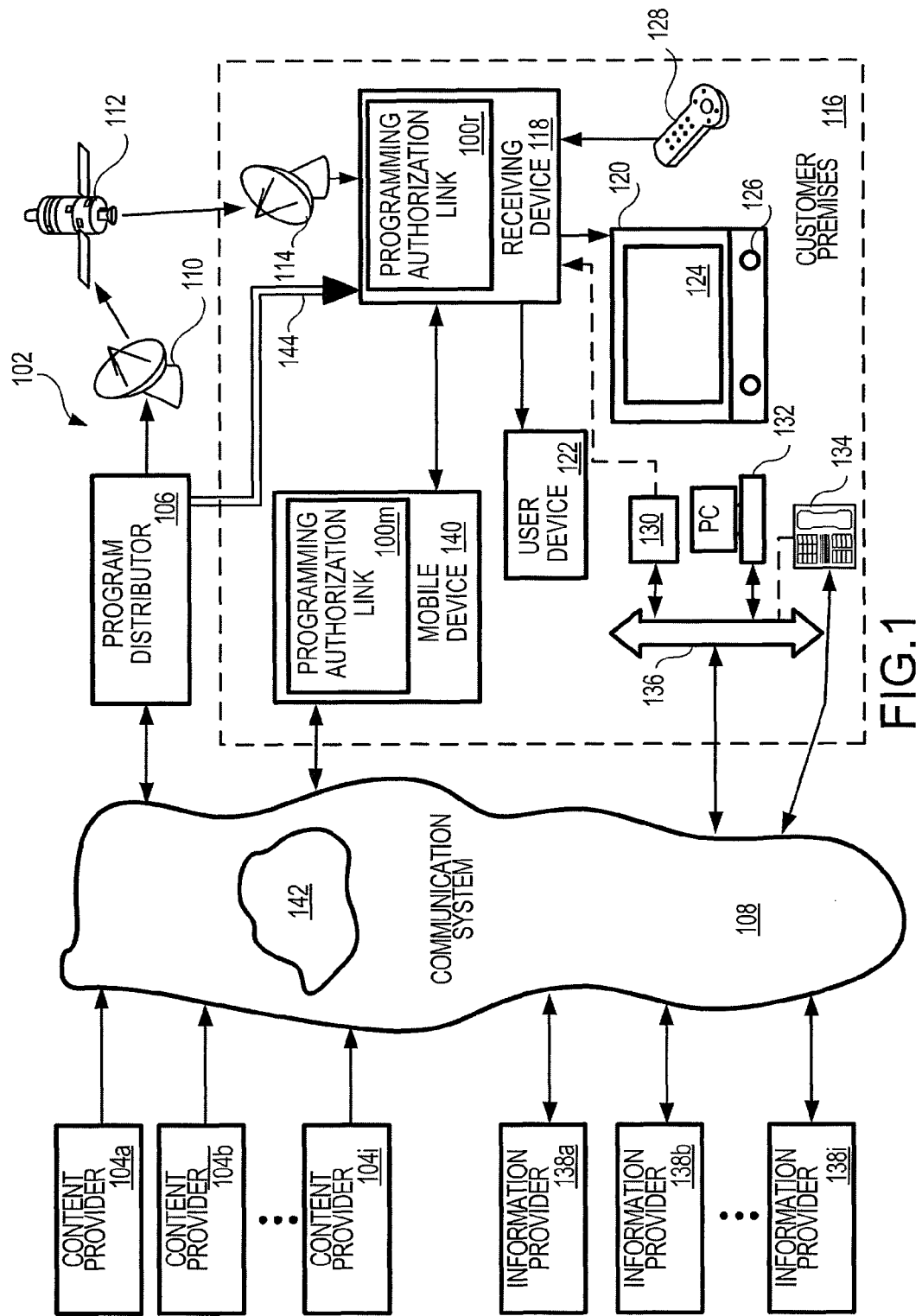
FIG. 1 is an overview block diagram illustrating an exemplary communication network.

FIG. 1 is an overview block diagram illustrating an exemplary communication network 102 in which embodiments of programming authorization links (PAL's) 100*r* and 100*m* may be implemented. FIG. 1 is just one example of a communications network 102, and the various embodiments discussed herein are not limited to this exemplary network.

A receiving device PAL 100*r* and a mobile device PAL 100*m* cooperatively facilitate communication between a receiving device 118, a mobile device 140, and a program distributor 106. For example, some circumstances may arise where a user wants to request authorized programming for delivery to a receiving device 118. In these circumstances, the request for authorized programming may be entered into the receiving device 118 and communicated to a program distributor 106 via the PAL's 100*r*, 100*m*. If the program distributor 106 grants the request, the authorization to use the programming may be communicated back from the program distributor 106 to the receiving device 118 via the PAL's 100*r*, 100*m*.

A receiving device PAL 100*r* is operationally coupled to a receiving device 118. In some embodiments, the receiving device PAL 100*r* may be integrated into the receiving device 118, and in other embodiments, the receiving device PAL 100*r* may be external to the receiving device 118. The receiving device PAL 100*r* may share hardware and/or software components with the receiving device 118, or the hardware and/or software components of the receiving device PAL 100*r* may primarily be operational for functions of the receiving device PAL 100*r*.

The mobile device PAL 100*m* is operationally coupled to a mobile device 140. In some embodiments, the mobile device PAL 100*m* may be integrated into the mobile device 140, and in other embodiments, the mobile device PAL 100*m* may be external to the mobile device 140. The mobile device PAL 100*m* may share hardware and/or software components with the mobile device 140, or the hardware and/or software components of the mobile device PAL 100*m* may primarily be operational for functions of the mobile device PAL 100*m*.

Communication network 102 can include a variety of communication systems and can use a variety of communication media including, but not limited to, satellite wireless media. In a satellite wireless example, communications network 102 may include an uplink dish 110, a satellite 112, and a downlink dish 114. In another non-limiting example, the communications network 102 may include a land-based cable infrastructure 144.

Program distributors 106 use communication system 108 to provide their customers with a multitude of audio/video and/or data programming at their premises 116. The programming provided by program distributors 106 may originate from one or more content providers 104*a*-104*i*, one or more information providers 138*a*-138*i*, from a program distributor 106 itself, and/or from another third party (not shown). The programming is received at the customer premises 116 via a receiving device 118 which may be communicatively coupled to a presentation device 120 configured to receive and present programming.

The customer of the program distributor 106 may be an individual person, a business, or any other entity that subscribes to programming from the program distributor 106. In contrast, a user of programming (a "user") may be a customer of the program distributor 106, but the user is not necessarily a customer. Thus, it is to be appreciated that a user may be any person, electronic device, or other entity that hears, sees, processes, or otherwise uses received programming.

The programming received and used at the customer premises 116 is authorized by the program distributor 106. The programming may be authorized on a revolving subscription basis, the programming may be authorized for a fixed time period, the programming may be authorized per use, and/or the programming may be authorized in any other suitable manner. In one non-limiting example, a user may request authorization for a single cost for each use of programming. In another non-limiting example, a user may request authorization to use premium programming, such as commercial-less broadcasts, first-run movies, sporting contests, and the like. It is to be appreciated that authorization from the program distributor 106 may originate from the program distributor 106, the content providers 104a-104i, the information providers 138a-138i, and/or another third party.

In some instances, the programming is received after it has been authorized. In some instances, the programming is encoded such that the programming may be received unconditionally and decoded after it has been authorized.

At the customer premises 116, receiving device 118 interconnects to one or more communications media and/or programming delivery systems (such as a cable head-end, satellite antenna, telephone company switch, Ethernet portal, off-air antenna, or the like) that propagate and/or deliver the programming. The receiving device 118 commonly receives a plurality of programming by way of the communications media and/or programming delivery systems.

From the plurality of programming, a user may select specific programming to hear, view, process, and/or otherwise use. In some embodiments, the programming may be used when a receiving device 118 processes and communicates the selected programming to one or more presentation devices 120. In some embodiments, the programming may be used when a receiving device 118 processes and communicates the selected programming to one or more endpoint devices, such as PCs 132, telephonic systems 134, user devices 122, data storage devices, TVs, game systems, sound system receivers, Internet connection devices, digital subscriber loop (DSL) devices, wireless LAN, WiFi, Worldwide Interoperability for Microwave Access (WiMax), and/or other intermediary devices 130.

Receiving device 118 may be interchangeably referred to by a general device description such as a "television converter," "receiver," "set-top box," "television receiving device," "television receiver," "programming receiver," "television recording device," "satellite set-top box," "satellite receiver," "cable set-top box," "cable receiver," and/or "television tuner." Accordingly, the receiving device 118 may be any suitable converter device or electronic equipment that is operable to receive programming. Further, the receiving device 118 may itself include user interface devices, such as buttons or switches. In many applications, the receiving device 118 (and also the presentation device 120, and/or other user devices 122) may be controlled by a remote device 128 in such a manner as to provide enhanced functionality and/or an enhanced presentation of the programming to a user.

The customer premises 116 where the receiving device 118 is located may be a business, home, multiple dwelling unit, or other facility to which the programming is delivered. In many implementations, one or more presentation devices 120 are located in or near a customer's premises 116 and are communicatively coupled directly or indirectly to the receiving device 118.

Examples of a presentation device 120 include, but are not limited to, a television (TV), a personal computer (PC), a sound system receiver, a digital video recorder (DVR), a compact disk (CD) device, a game system, or the like. Presentation devices 120 may employ a display 124, one or more speakers 126, or other output devices to communicate video, audio, and/or data content to a user.

Some customer premises 116 include an optional network 136, or a networked system, to which receiving devices 118, presentation devices 120, and/or a variety of user devices 122 (collectively referred to as endpoint devices), can be coupled. Non-limiting examples of network 136 include, but are not limited to, an Ethernet, twisted pair Ethernet, an intranet, a local area network (LAN) system, or the like. One or more endpoint devices, such as PCs 132, telephonic systems 134, data storage devices, TVs, game systems, sound system receivers, Internet connection devices, digital subscriber loop (DSL) devices, wireless LAN, WiFi, Worldwide Interoperability for Microwave Access (WiMax), or other intermediary devices 130, are communicatively coupled to network 136 so that the plurality of endpoint devices are communicatively coupled together. Thus, the network 136 allows the interconnected endpoint devices, and the receiving device 118, to communicate with each other.

Users of programming may also use mobile devices 140. Some non-limiting examples of mobile devices 140 are cell phones, personal media players (PMP's), personal digital assistants (PDA's), laptop computers, handheld personal computers (HPC's), and the like. Such mobile devices 140 may permit a user of the mobile device to create, edit, and manage information. Such mobile devices 140 may additionally and/or alternatively permit a user of the mobile device 140 to communicate with target destinations by sending and/or receiving information.

Mobile devices 140 may communicate with receiving devices 118. A mobile device 140 and a receiving device 118 may communicatively couple to each other via one or more wireless circuits and/or protocols, for example, but not limited to, Bluetooth, infrared, UHF, WiFi, another radio frequency (RF), or the like. For example, in some embodiments, the mobile device 140 has a Bluetooth radio chipset that is operatively used to communicate with a corresponding Bluetooth radio chipset of the receiving device 118. As another example, the mobile device 140 and the receiving device 118 may have hardware and software configured to communicate via an IEEE 802.11 protocol. In some embodiments, the communicative coupling between a wireless circuit of the mobile device 140 and a wireless circuit of the receiving device 118 is based on proximity, signal availability, and/or the like.

Alternatively, or additionally, mobile devices 140 and receiving devices 118 may communicatively couple with each other via one or more physical mediums and protocols such as, but not limited to, USB, IEEE 1394 (FireWire), Ethernet, twisted pair, and the like. For example, a mobile device 140 may be docked in a cradle coupled to the receiving device 118 via a USB cable. In some embodiments, the communicative coupling between the mobile device 140 and the receiving device 118 only occurs when the mobile device 140 is physically coupled to the receiving device 118.

In some embodiments, the mobile device 140 has a non-cellular radio chipset. The mobile device 140 may then communicate with a target destination via a medium such as a private radio link, an open format radio link, or another digital and/or analog RF medium.

In some embodiments, the mobile device 140 has an integrated cellular radio chipset. Thus, communication to a target destination may be via a medium such as, but not limited to, a commercial and/or private cellular network, or the like.

A cellular network 142 is broadly encompassed within the communication system 108. The cellular network 142 may be any available network suitable for transmitting and receiving data between mobile and/or fixed point devices, or the cellular network 142 may be dedicated to a primary purpose of delivering the information to known cellular subscribers and/or receiving information from known cellular subscribers. Accordingly, cellular subscribers may receive and transmit information between a mobile device 140 and a target destination. It is to be appreciated that the cellular network 142 may include both wired and wireless infrastructure; for example, transceivers, repeaters, switches, antennas, access points, routers, public switched telephone networks, codecs, multiplexers, de-multiplexers, and the like.

Figure 2:
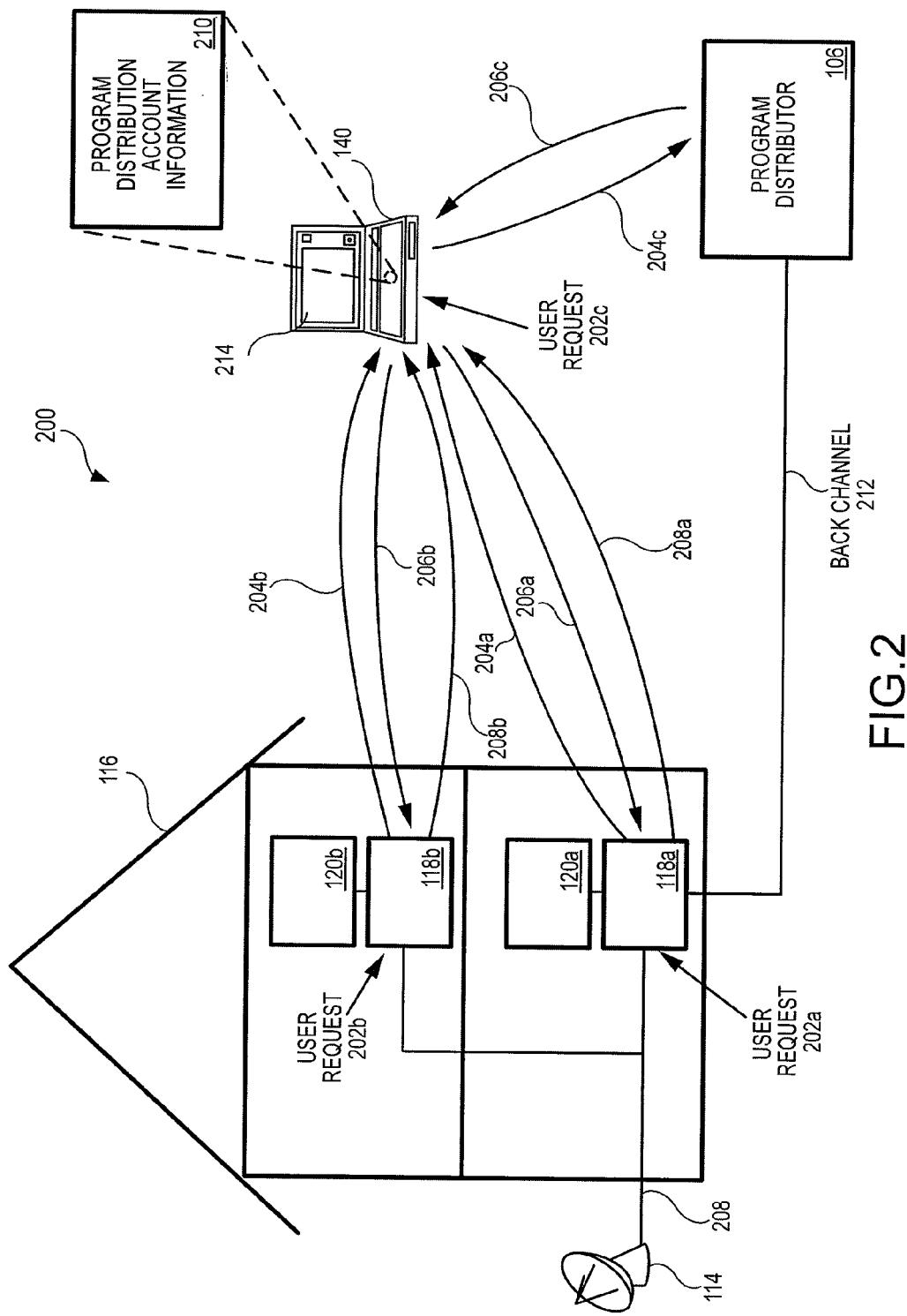
FIG. 2 is a block diagram illustrating an embodiment of a system to communicate authorization requests, authorization, and authorized programming between a receiving device, a mobile device, and a program distributor.

FIG. 2 is a block diagram illustrating an embodiment of a system 200 to communicate authorization requests 204a, 204b, 204c, authorization 206a, 206b, 206c, and authorized programming 208, 208a, 208b between a receiving device 118, a mobile device 140, and a program distributor 106. The authorization requests 204a, 204b, 204c, authorization 206a, 206b, 206c, and authorized programming 208, 208a, 208b are conceptually illustrated in FIG. 2 as arrowed lines, which indicate the direction that the information is communicated. It is to be appreciated that in some embodiments, in order to facilitate the information flow as illustrated, additional communications may occur in the opposite direction. For example, in some embodiments, requests or other communications in one direction may be acknowledged with communications in the other direction. In additional and/or other circumstances, devices may operate in a master/slave and/or polled configuration where communication may also occur in multiple directions.

The exemplary system 200 includes a customer's premises 116. A customer's premises 116 may have one or more receiving devices 118a, 118b coupled to respective presentation devices 120a, 120b. One or more receiving devices 118a, 118b may be communicatively coupled to a downlink dish 114, a land-based cable infrastructure 144 (FIG. 1), or the like in order to receive authorized programming 208. One or more receiving devices 118a, 118b may be coupled to the program distributor 106 via a back-channel wired or wireless communication system 212, for example, a plain old telephone system (POTS), an integrated services digital network (ISDN) line, a voice over Internet protocol (VoIP) system, and/or other suitable system.

The authorization requests 204a, 204b, 204c may originate as user requests 202a, 202b, 202c (also illustrated as arrowed lines). In some instances, a user request 202a, 202b may be entered into a receiving device 118a, 118b. In other instances, a user request 202c may be entered into a mobile device 140. A user may enter a user request 202c into the mobile device 140 when the mobile device 140 is inside the customer's premises 116, near the customer's premises 116, and/or far away from the customer's premises 116.

In some instances, a user may want to use programming that has not previously been authorized by a program distributor 106. To use the programming, the user must communicate with the program distributor 106 and make a request.

In exemplary embodiments of the system 200, a programming authorization link 100m (FIG. 1) of a mobile device 140 may be cooperatively engaged to request authorization from the program distributor 106 via an authorization request 204c. Upon receipt of authorization 206c from the program distributor 106, the authorized programming 208 received by a receiving device 118a, 118b may then be used.

In some instances, a user may want to use the authorized programming 208 with a mobile device 140. For example, the mobile device 140 may have sufficient memory to store authorized programming 208a, 208b, and thus the mobile device 140 may be used as additional storage space for authorized programming 208a, 208b. In another example, a user may want to use the mobile device 140 to present and/or process authorized programming. Accordingly, the authorized programming 208a, 208b may be communicated to the mobile device 140 for immediate and/or future use, such as for output to a display 214 of the mobile device 140. It is to be appreciated that authorized programming 208a, 208b is all or part of authorized programming 208. Authorized programming 208a, 208b may be communicated to mobile device 140 with one or more receiving devices 118a, 118b, respectively.

As described above, authorized programming 208, 208a, 208b may be used in many different ways. Additionally, various embodiments allow users to request authorization for programming using a plurality of different processes. For example, in some embodiments, a user may be situated in close proximity to a receiving device 118a, 118b. Thus, a user may request authorization for programming via a user request 202a, 202b entered into a receiving device 118a, 118b. In cases where the user's request 202a, 202b is entered into a receiving device 118a, 118b, the receiving device 118a, 118b may process the user's request 202a, 202b into an authorization request 204a, 204b. The authorization request 204a, 204b may then be communicated to the mobile device 140 for processing and/or communication to the program distributor 106.

As another example, a user may conveniently have access to a mobile device 140. Accordingly, the user may request authorization for programming via a user request 202c entered directly into the mobile device 140. The user request 202c may be entered via a user interface on the mobile device 140, and/or the user request 202c may be entered via another suitable means. When the user request 202c is entered into a mobile device 140, the user request 202c may be further processed within the mobile device 140.

In some cases, the user may enter a request to use authorized programming with an external source, such as a remote device 128, a PC 132 (FIG. 1), or other suitable device. Further, in some embodiments, the user may enter the request directly into a user interface integrated in and/or coupled to the receiving device 118a, 118b.

Upon receipt of an authorization request 204a, 204b from a receiving device 118, and/or upon receipt of a user request 202c into the mobile device 140, the request may be further processed to produce an authorization request 204c. Subsequently, the authorization request 204c may be communicated by the mobile device 140 to the program distributor 106.

In some embodiments, the user request 202c and/or the authorization request 204a, 204b includes program distribution account information 210. The program distribution account information 210 may be communicated to the program distributor 106 as part of authorization request 204c, or the program distribution account information 210 may be communicated in a different manner. For example, if the program distribution account information 210 is already available to the program distributor 106, an authorization request 204c may have an identifier embedded therein so that the program distributor can relate the authorization request 204c to the corresponding user.

The program distribution account information 210 may include any information necessary for the program distributor 106 to sufficiently identify the user and determine whether or not to grant the authorization. For example, program distribution account information 210 may optionally include, but is not limited to, information about the user such as physical addresses, credit account information, and/or billing account information. Thus, a program distributor 106 may condition the issuance of authorization to use programming on one or more elements communicated in, and/or derived from, the program distribution account information 210.

Conditional authorization by an authorizing party, such as a content provider 104a-104i (FIG. 1), an information provider 138a-138i (FIG. 1), and/or a program distributor 106 that authorizes the use of programming may be performed by the authorizing party in any suitable manner. For example, if the program distributor 106 determines from the program distribution account information 210 that the user is a current and/or past customer in good standing, then the program distributor 106 may automatically authorize use of the programming. In another example, the program distributor 106 may derive sufficient information from the program distribution account information 210 such that the program distributor 106 may immediately receive payment (or a promise of payment) for the programming. Thus, once payment is assured, the program distributor 106 may immediately authorize use of the programming. In other circumstances, information embedded in or derived from the program distribution account information 210 satisfies conditions established by the program distributor 106 that are necessary for the program distributor 106 to grant authorization. That is, authorization is conditioned on the communicated program account distribution information 210 indicating to the authorizing party that the authorization request 206c should be authorized.

Program distribution account information 210 may be stored in a memory in the mobile device 140. In some instances, program distribution account information 210 may be received by a mobile device 140 from a program distributor 106. In other instances, program distribution account information 210 may be entered into the mobile device 140 by a user and/or another electronic device (not shown). In some embodiments, program distribution account information 210 may be communicated to a mobile device 140 from a receiving device 118a, 118b. When the program distribution account information 210 is communicated from a receiving device 118a, 118b, the information may be communicated as part of an authorization request 204a, 204b, or the information may be communicated with a different message (not shown).

The mobile device 140 may be operable to receive from the program distributor 106, an authorization 206c to use the programming. The authorization 206c may be in response to a specific authorization request 204c. Additionally, or alternatively, the authorization 206c may be communicated by the program distributor 106 without having been requested. For example, if the program distributor 106 were to offer a "free weekend of premium programming" to past authorized users as a promotion, the program distributor 106 may send authorization 206c to the mobile device 140 at any suitable time.

Upon receipt of authorization 206c, the mobile device 140 may process the authorization 206c. Processing the authorization 206c may include internal configuration of the mobile device 140 to permit use of the authorized programming 208a, 208b with the mobile device 140. For example, authorization 206c may permit configuration of the mobile device 140 for presenting authorized programming 208a, 208b on a display 214 integrated with and/or coupled to the mobile device 140. Alternatively, and/or additionally, processing the authorization 206c may include generation of authorization 206a, 206b, for subsequent communication to a receiving device 118a, 118b.

Upon generation of authorization 206a, 206b, the mobile device 140 may be operable to communicate the authorization 206a, 206b to a receiving device 118a, 118b. In some embodiments, once the authorization 206a, 206b is communicated by the mobile device 140, the receiving device 118a, 118b is allowed by the authorizing party to use authorized programming 208. In other embodiments, the receiving device 118a, 118b must further process the authorization 206a, 206b. For example, in some circumstances, the receiving device 118a, 118b will acknowledge the authorization 206a, 206b and communicate back to the program distributor 106, the content provider 104a-104i, the information provider 138a-138i, and/or another authorizing party.

Figure 3:
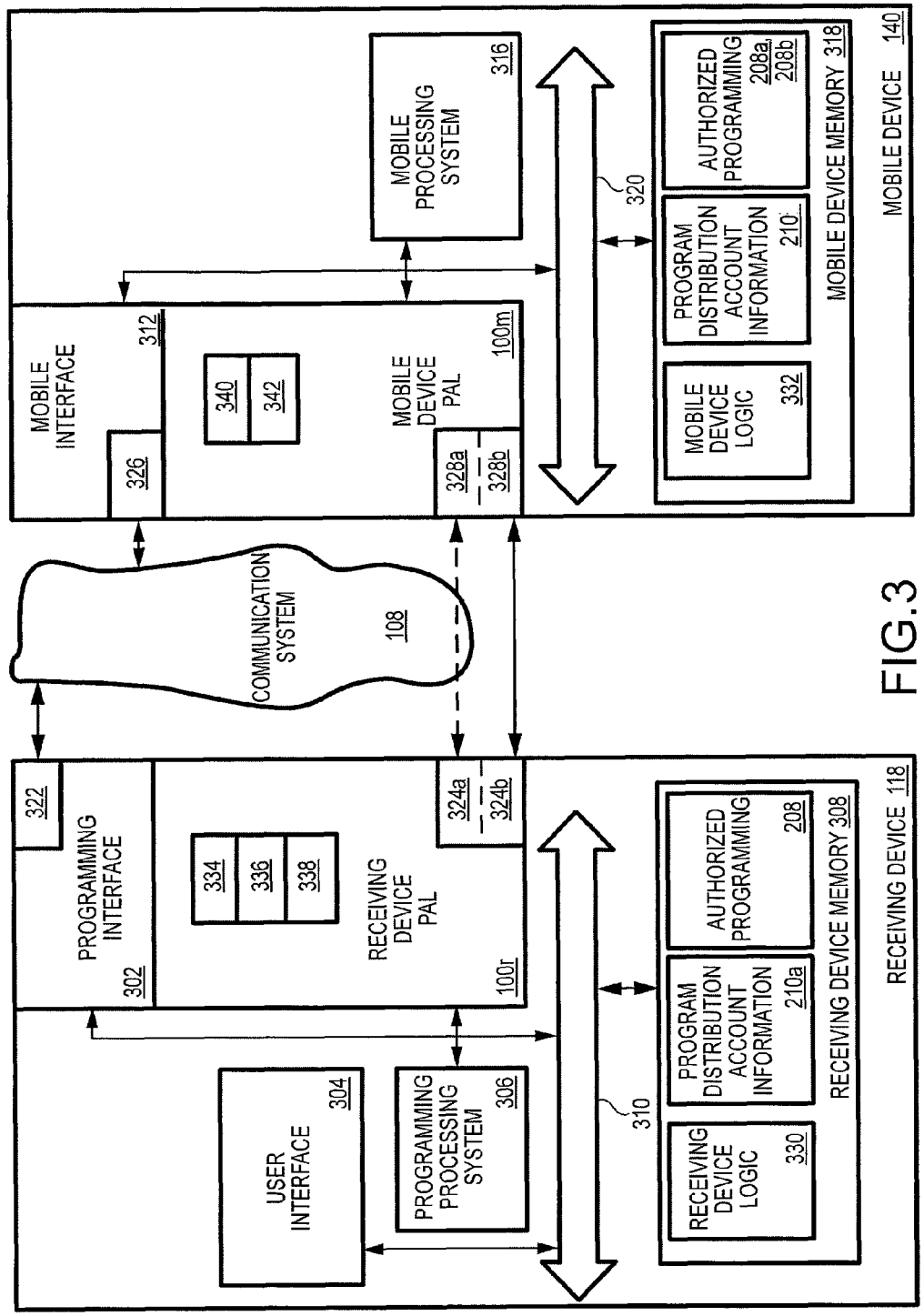
FIG. 3 is a block diagram illustrating a receiving device and a mobile device.

FIG. 3 is a block diagram illustrating a non-limiting example of a receiving device 118 and a mobile device 140. Receiving device 118 comprises programming interface 302, receiving device PAL 100r, programming processing system 306, receiving device memory 308, and receiving device system bus 310. Mobile device 140 comprises mobile interface 312, mobile device PAL 100m, mobile processing system 316, mobile device memory 318, and mobile device system bus 320.

In the receiving device 118 embodiment illustrated in FIG. 3, receiving device PAL 100r, programming interface 302, user interface 304, programming processing system 306, and receiving device memory 308, are illustrated as communicatively coupled to each other via receiving device system bus 310. In the embodiment of mobile device 140 illustrated in FIG. 3, mobile device PAL 100m, mobile interface 312, mobile processing system 316, and mobile device memory 318 are illustrated as communicatively coupled to each other via mobile device system bus 320.

Receiving device system bus 310 and/or mobile device system bus 320 provide connectivity between the above-described components within receiving device 118 and/or mobile device 140 respectively. Receiving device system bus 310 and/or mobile device system bus 320 may include any known signal communication architectures. In alternative embodiments, the above-described components may be communicatively coupled in a different manner than illustrated in FIG. 3. For example, one or more of the above-described components may be directly coupled to other components, or may be coupled to each other, via intermediary components (not shown). In some embodiments, receiving device system bus 310 and/or mobile device system bus 320 may be omitted and the respective components of receiving device 118 and/or mobile device 140 may be coupled directly to each other using suitable connections.

Receiving device 118 has a programming interface 302 to receive authorized programming 208 (FIG. 2) from a program distributor 106 (FIGS. 1 and 2). Programming interface 302 may be configured to receive programming from a land-based cable infrastructure 144 (FIG. 1), a satellite network including a downlink dish 114 (FIG. 1), and/or any other suitable system. In some circumstances, when the programming is received via programming interface 302, the receiving device 118 is operable to present the programming to one or more output devices, e.g., display 124 (FIG. 1) and/or speakers 126 (FIG. 1). In other and/or additional circumstances, the programming may include software and/or media upon which another processing device may operate, such as a PC 132 (FIG. 1).

In some embodiments, one or more transceivers 322 may be coupled to the programming interface 302. A transceiver 322 coupled to the programming interface 302 may be operable to facilitate the communication of the authorized programming 208 (FIG. 2) from communication system 108 in a wired, wireless, and/or other suitable manner. Alternatively, or in addition, a transceiver 322 of the programming interface 302 may be operable to communicate in a bi-directional manner. That is, the transceiver 322 may be operable to both receive information and to send information.

In one example, a transceiver 322 of the programming interface 302 may facilitate communication of authorized programming 208 from a program distributor 106 into the receiving device 118. In other example, a transceiver 322 of the programming interface 302 may facilitate communication of an acknowledgement to a program distributor 106 that authorized programming 208 is used. In other words, there are some embodiments where the transceiver includes the electronic hardware operable to convert between information used by the programming processing system 306 and information communicable through the communication system 108.

The receiving device 118 has a receiving device PAL 100r. A receiving device PAL 100r is operable to transmit and receive information between the receiving device 118 and a mobile device 140. For example, as described above, the receiving device PAL 100r may facilitate communication of authorization requests 204a, 204b (FIG. 2), authorization 206a, 206b (FIG. 2), and/or authorized programming 208a, 208b (FIG. 2). Communication between the receiving device 118 and the mobile device 140 may be by a request/response mechanism, a master/slave mechanism, or any other suitable mechanism.

The receiving device PAL 100r may be coupled with one or more transceivers 324a, 324b. A transceiver coupled to the receiving device PAL 100r may be operable to facilitate the communication between the receiving device 118 and a mobile device 140. The transceiver may communicate over a wired, a wireless, and/or other suitable media.

In some embodiments, separate transceivers 322, 324a, 324b may communicate with separate targets and/or devices. In a first example, different transceivers 322, 324a, 324b may be used for receiving authorized programming than are used for communicating information with a mobile device 140. In a second example, one transceiver may be used for sending an authorization request 204a, 204b, another transceiver may be used for receiving an authorization 206a, 206b, and a different transceiver may be used for sending authorized programming 208a, 208b. Accordingly, it is to be appreciated that in some embodiments, one or more transceivers may be commonly coupled for use within the programming interface 302 and the receiving device PAL 100r.

In some embodiments, the receiving device PAL 100r may be configured as a single device with logic capable of facilitating communication of authorization requests 204a, 204b, authorization 206a, 206b, and/or authorized programming 208a, 208b. For example, a particular grouping of hardware components and/or software logic may operate to facilitate all communication between the receiving device 118 and the mobile device 140.

Alternatively, the receiving device PAL 100r may be configured as two or more devices with multiple interfaces acting in cooperation. For example, the receiving device PAL 100r may be configured as one or more devices having a command interface 334, a first mobile device interface 336, and a second mobile device interface 338. A command interface 334 may be operable to communicate an authorization request 204a, 204b to a mobile device 140. A first mobile device interface 336 may be operable to receive authorization 206a, 206b from the mobile device 140. A second mobile device interface 338 may be operable to communicate authorized programming 208a, 208b to the mobile device 140.

In embodiments where the receiving device PAL 100r is configured with two or more devices and multiple interfaces, the interfaces may have separate hardware components and/or software logic primarily for controlling their own functions. Additionally or alternatively, the interfaces 334, 336, 338 of the receiving device PAL 100r may share hardware components and/or software logic between their functions. For example, in an embodiment with multiple interfaces, communications to the mobile device 140 may be facilitated with one interface, and communications from the mobile device 140 may be facilitated with another interface. In another example, an authorization request 204a, 204b may be communicated through one interface (e.g., interface 334), an authorization 206a, 206b may be communicated through another interface (e.g., interface 336), and authorized programming 208a, 208b may be communicated through a third interface, (e.g., interface 338).

Accordingly, it is to be appreciated that within the PAL 100r, various interfaces may be conceptually described, and the devices that implement the interfaces may or may not be physically separate, and may or may not share hardware components and/or software logic. Additionally, in some embodiments, transceivers 324a, 324b may be primarily used by single interfaces 334, 336, 338, and in other embodiments, transceivers 324a, 324b are cooperatively shared by interfaces 334, 336, 338. Thus, it is to be appreciated that in embodiments of the receiving device PAL 100r, one or more transceivers may be coupled to one or more interfaces to facilitate communication of authorization requests, authorization, and programming with a mobile device 140.

The interfaces 334, 336, 338 within the PAL 100r may comprise hardware, logic, memory space, data structures, and/or other information useful for generating and/or passing authorization requests 204a, 204b, authorization, 206a, 206b, and programming 208a, 208b, through a receiving device 118. In some embodiments, all or parts of one or more interfaces 334, 336, 338 are closely coupled with the programming processing system 306 and/or the receiving device memory 308. Thus, the programming processing system 306 is configured to operationally control the interfaces 334, 336, 338. In other embodiments, the interfaces 334, 336, 338 primarily operate without control from programming processing system 306 and/or the receiving device memory 308. In such embodiments where one or more interfaces 334, 336, 338 are not primarily controlled by the programming processing system 306 and/or the receiving device memory 308, the interfaces 334, 336, 338 have logic to separately process and/or generate communications related to authorized programming and pass the communications through the receiving device 118.

The receiving device PAL 100r may be used when the receiving device 118 is in reception range of the mobile device 140. When the devices are in reception range, a communication path may be established between the receiving device 118 and the mobile device 140. Exemplary communication systems suitable to establish a communication path include systems such as infrared, RF, Bluetooth, or other like systems.

Additionally, or alternatively, the receiving device PAL 100r may also facilitate communication when the receiving device 118 is not in reception range of the mobile device 140. When the devices are not in reception range to each other, communication may be through an intermediate communication network. For example, in some embodiments, the receiving device 118 may use a back-channel wired or wireless communication system 212 (FIG. 2) to pass communications through communication system 108 and/or cellular network 142 (FIG. 1). In embodiments where the receiving device 118 is passing communications through communication system 108, a mobile device 140 may use an available cellular or other communication network to communicate with the receiving device 118.

The user interface 304 of receiving device 118 may comprise wired and/or wireless devices and/or logic that permit a user to enter a user request 202a, 202b into the receiving device 118. For example, in some embodiments, a user interface 304 may have an infrared receiver (not shown), a radio receiver (not shown), and/or an electro-mechanical receiver (not shown) for accepting user requests 202a, 202b.

The user request 202a, 202b may be generated by an external source and communicated to the receiving device 118 by the external source. For example, external sources for generating and communicating a user request 202a, 202b may include, but are not limited to, a remote control 128, other keyed input devices (not shown), and/or other controllers of the presentation device 120 (FIG. 1) and/or receiving device 118. In some embodiments, a software algorithm system (not shown) may be used wherein a menu or the like is presented to a user. Accordingly, a user request 202a, 202b may be generated via a displayed menu system.

The receiving device memory 308 of the receiving device 118 may be operatively used to store several integrated and/or component blocks of software code and/or data. For example, in some embodiments, receiving device memory 308 may store receiving device logic 330, program distribution account information 210a, and/or authorized programming 208. Receiving device memory 308 may include either volatile or non-volatile storage, or both.

The programming processing system 306 of receiving device 118 includes any single device or combination of devices for operationally controlling the receiving device 118. The programming processing system 306 of receiving device 118 may be operationally controlled by the receiving device logic 330. In some embodiments, the primary function of programming processing system 306 is to process authorized programming 208.

Alternatively or additionally, the programming processing system 306 may process a user request 202a, 202b and generate an authorization request 204a, 204b (FIG. 2). The programming processing system 306 may cooperatively use the receiving device PAL 100r to control communications with a mobile device 140. For example, at some times, the programming processing system 306 may control transmission of authorization requests 204a, 204b and/or authorized programming 202a, 202b (FIG. 2) to a mobile device 140. In other instances, the programming processing system 306 may receive from the mobile device 140, authorization 206a, 206b to use the authorized programming 208.

The mobile device 140 may have a mobile interface 312 for facilitating communication with other mobile devices, fixed point devices, electronic communication equipment, and/or the like. In some embodiments, one or more transceivers 326 may be coupled to the mobile interface 312. A transceiver 326 coupled to the mobile interface 312 may be operable to facilitate communication between the mobile device 140 and a program distributor 106. For example, a transceiver 326 coupled to the mobile interface 312 may be operable to facilitate communication of an authorization request 204c to a program distributor 106, and/or to receive authorization 206c from a program distributor 106 in a wired, wireless, and/or like manner.

In some embodiments, the mobile device 140 has a mobile device PAL 100m to transmit and receive information between the mobile device 140 and a receiving device 118. For example, as described above, the mobile device PAL 100m may facilitate communication of authorization requests 204a, 204b (FIG. 2), authorization 206a, 206b (FIG. 2), and/or authorized programming 208a, 208b (FIG. 2). Communication between the mobile device 140 and the receiving device 118 may be by any suitable mechanism employed by the devices.

The mobile device PAL 100m may be coupled with one or more transceivers 328a, 328b. A transceiver 328a, 328b coupled to the mobile device PAL 100m may be operable to facilitate communication between the mobile device 140 and a receiving device 118 when the devices are in reception range. The transceiver 328a, 328b may operate in a wired, a wireless, and/or a like manner.

In some embodiments, separate transceivers 326, 328a, 328b may communicate with different targets. In a first example, different transceivers 326, 328a, 328b may be used for communicating information with a target distributor 106 than are used for communicating information with a receiving device 118. In a second example, one transceiver may be used for receiving an authorization request 204a, 204b, another transceiver may be used for sending an authorization request 204c. In a third example, one transceiver may be used for receiving authorization 206c, and another transceiver may be used for sending authorization 206a, 206b. In a fourth example, another transceiver may be used to receive authorized programming 208a, 208b. Accordingly, it is to be appreciated that in some embodiments, the functions of one or more transceivers 326, 328a, 328b may be commonly coupled within a single hardware device for carrying out communications of both the mobile interface 312 and the mobile device PAL 100m.

In some embodiments, the mobile device PAL 100m may be configured as a single device with logic capable of facilitating communication of authorization requests 204a, 204b, 204c, authorization 206a, 206b, 206c, and/or authorized programming 208a, 208b. For example, a particular grouping of hardware components and/or software logic may operate to facilitate all communication between the mobile device 140, the receiving device 118, and the program distributor 106. Thus, the single device and/or logic may cooperatively use the mobile interface 312 and/or the mobile device PAL 100m.

Alternatively, the mobile device PAL 100m may be configured as two or more devices with multiple interfaces acting in cooperation. For example, the mobile device PAL 100m may have a first communication interface 340 operable to communicate program distribution account information 210 to a program distributor 106 and/or operable to receive authorization 206c from a program distributor 106. The mobile device PAL 100m may have a second communication interface 342 operable to communicate authorization 206a, 206b to a receiving device 118 and/or operable to receive authorized programming 208a, 208b from the receiving device 118.

In embodiments where the mobile device PAL 100m is configured with two or more devices and multiple interfaces, the interfaces may have separate hardware components and/or software logic primarily for controlling their own functions. Additionally or alternatively, the interfaces 340, 342 of the mobile device PAL 100m may share hardware components and/or software logic between their functions. For example, in an embodiment with multiple interfaces, an authorization request 204c to a program distributor 106 may be communicated through one interface, and authorization 206c may be communicated through another interface. In another example, an authorization request 204a, 204b may be received with one interface, and authorization 206a, 206b may be transmitted with another. In still another example, programming 208a, 208b may be communicated with another interface. Accordingly, it is to be appreciated that within the PAL 100m, various interfaces may be described, and the devices that implement the interfaces may or may not be physically separate, and may or may not share hardware components and/or software logic.

The interfaces 340, 342 within the PAL 100m may comprise hardware, logic, memory space, data structures, and/or other information useful for generating and/or passing authorization requests 204a, 204b, 204c, authorization, 206a, 206b, 206c, and programming 208a, 208b, through a mobile device 140. In some embodiments, all or parts of one or more interfaces are closely coupled with the mobile processing system 316 and/or the mobile device memory 318. Thus, the mobile processing system 316 is configured to operationally control the interfaces. In other embodiments, the interfaces primarily operate without control from mobile processing system 316 and/or the mobile device memory 318. In such embodiments where one or more interfaces are not primarily controlled by the processing system 316 and/or the mobile device memory 318, the interfaces have logic for generating and/or processing in the mobile device 140.

The mobile device PAL 100m may be used when the mobile device 140 and a receiving device 118 are in reception range to each other. Communication via the mobile device PAL 100m may be by a request/response configuration, a master/slave configuration, or any other suitable configuration corresponding to a cooperative configuration of a receiving device 118.

In an additional or alternative embodiment, the mobile device 140 may not be in reception range of a receiving device 118. In cases where the devices are not in reception range, the mobile device PAL 100m may communicate with the receiving device 118 through an intermediate communication network, such as communication system 108 and/or cellular network 142 (FIG. 1).

A user request 202c may be generated a user and/or by an external source and communicated to the mobile device 140 by the external source. For example, a user may use an input mechanism integrated into the mobile device 140 to enter the user request 202c to use authorized programming 208. In another example, a user request to use authorized programming 202a, 202b, 202c may be received with the mobile interface 312 and/or the mobile device PAL 100m. For example, in some instances, a user request 202c may be passed into the mobile device as part of a text message, an email message, or some other suitable message communicated through communication system 108.

The mobile device memory 318 of the mobile device 140 may be operatively used to store several integrated and/or component blocks of software code and/or data. For example, in some embodiments, mobile device memory 318 may store mobile device logic 332, program distribution account information 210, and/or authorized programming 208a, 208b. Mobile device memory 318 may include either volatile or non-volatile storage, or both.

In some embodiments, the program distribution account information 210 corresponds to some or all of the corresponding program distribution account information 210a stored in the receiving device memory 308 of the receiving device 118. In some embodiments, alternatively or additionally, the program distribution account information 210 may be directly entered into the mobile device 140 by a user, may be received from the receiving device 118, or may be received from some other device. For example, in some embodiments, the information may be manually entered by a user of the mobile device 140 via the mobile device's input system, and/or in other embodiments, the information may be received directly from a program distributor 106 or some other source.

The mobile processing system 316 of mobile device 140 includes any single device, or combination of devices, for operationally controlling the mobile device 140. The mobile processing system 316 of mobile device 140 may be operationally controlled by the mobile device logic 332. In some embodiments, the primary function of mobile processing system 316 is to process the mobile communications of the mobile device 140. In other embodiments, however, the mobile processing system 316 may also generate authorization request 204c (FIG. 2) and process received authorization 206c.

When an authorization request 204c is generated from a user request 202c and/or an authorization request 204a, 204b, the authorization request 204c is communicated to a program distributor 106. The authorization request 204c may have a request to use programming 202a, 202b from a receiving device 118, and/or may have a request to use programming 202c from a mobile device 140.

An authorization 206c to use the programming is received by the mobile device 140 from a program distributor 106. In some embodiments, a same or corresponding authorization 206a, 206b to use the programming is generated and communicated to a receiving device 118. In some embodiments, the authorization 206a, 206b, 206c to use programming permits the receiving device 118 to use the authorized programming 208. In some embodiments, the authorization 206a, 206b, 206c to use programming permits the mobile device 140 to receive, store, and or use the programming 208a, 208b.

Referring to FIGS. 2 and 3, several examples of interaction between a receiving device 118 and a mobile device 140 are now described. These examples are merely non-limiting examples of how authorized programming 208, 208a, 208b may be authorized and communicated with receiving devices 118 and mobile devices 140.

In a first example, a user is willing to pay an additional fee to watch a particular program (e.g., pay-per-view) offered by a program distributor 106. With a remote device 128, the user may enter a user request 202a, which is received by a receiving device 118. The programming processing system 306 of the receiving device 118 works cooperatively with the user interface 304 and the receiving device logic 330. The programming processing system 306 may then generate an authorization request 204a to use authorized programming 208, and the authorization request 204a may have program distribution account information 210a embedded within. The programming processing system 306, working in cooperation with the receiving device PAL 100r, may recognize that a mobile device 140 is in reception range of the receiving device 118. Accordingly, the authorization request 204a may be communicated between the receiving device PAL 100r and the mobile device PAL 100m.

Upon receipt of an authorization request 204a to use authorized programming 208, the mobile processing system 316 of the mobile device 140 may work in cooperation with the mobile device PAL 100m and the mobile device logic 332. The program distribution account information 210a may be processed and stored in the mobile device memory 318 as program distribution account information 210. Subsequently, the mobile processing system 316 of the mobile device 140 may work in cooperation with the mobile device logic 332 to generate an authorization request 204c. The authorization request 204c may have program distribution account information 210 embedded therein. The authorization request 204c may then be communicated to the program distributor 106 through mobile device PAL 100m and/or mobile interface 312.

If the program distributor 106 authorizes the use of programming 208, the program distributor 106 may respond to the authorization request 204c by sending an authorization 206c back to the mobile device 140. Upon receiving an authorization 206c from the program distributor 106, the authorization 206c may be further processed by the mobile processing system 316. The mobile processing system 316 may generate authorization 206a and communicate authorization 206a to the receiving device 118. Authorization 206a may permit the receiving device 118 to use authorized programming 208, for example, by presenting authorized programming 208 on a presentation device 120 (FIG. 1) for the user.

In another example, the user that purchased authorization to use the particular pay-per-view program may further want to use the pay-per-view program with his mobile device 140. In addition to the example previously presented, the user's request for authorization may contain an additional request for authorization to use the programming on his mobile device. If the additional use is permitted by the program distributor 106, then some or all of the authorized programming 208 may be communicated to the mobile device 140 as authorized programming 208a. The authorized programming 208a may then be stored in mobile device memory 318 and/or presented to the mobile device 140 user via a presentation mechanism, for example a display 214, of the mobile device 140.

Figure 4:
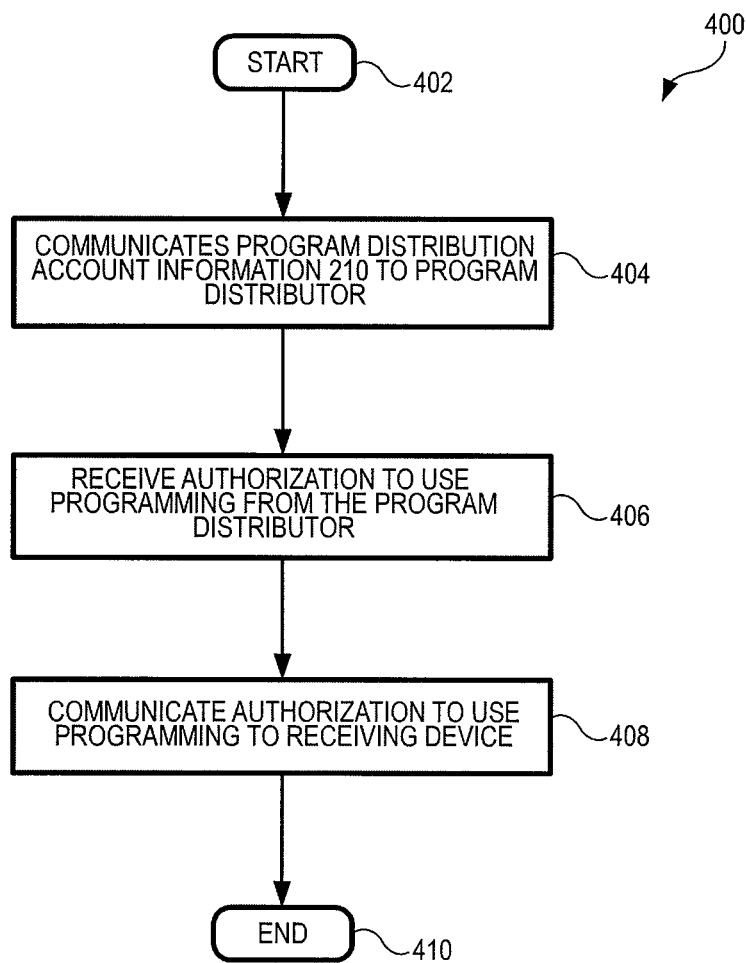
FIG. 4 is a flowchart illustrating a process used by an embodiment of a system to communicate authorized programming between a receiving device and a mobile device.

FIG. 4 is a flowchart illustrating a process used by an embodiment of a system to communicate authorized programming between a receiving device and a mobile device. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 4, the process 400 is ongoing with operation of the mobile device 140 and is illustrated as starting at 402. At 404, a mobile device 140 communicates program distribution account information 210, or a portion thereof, to an authorizing party, such as a program distributor 106. At 406, the mobile device 140 receives authorization to use programming 206c from the authorizing party. At 408, the mobile device 140 communicates the authorization to use programming 206c to a receiving device 118. The process ends at 410.

In some embodiments, the authorization request 204c is communicated to an authorizing party, such as, but not limited to, a content provider 104a-104i (FIG. 1), an information provider 138a-138i, a program distributor 106, and/or another third party. In some instances, where the program distributor 106 is not the authorizing party, the authorization 206c may be communicated by the authorizing party to the program distributor 106 for communication to the mobile device 140. Alternatively, or additionally, the authorization 206c may be communicated to the mobile device 140 by the authorizing party.

It is to be appreciated that the examples described above do not represent the full spectrum of requests, authorizations, and communications that may be generated with the embodiments illustrated in FIGS. 1-4. Other authorization requests may be made, other program distribution account information and/or individual account information may be communicated, and/or other programming may be authorized.

While various embodiments have been described hereinabove, it is to be appreciated that various changes in form and detail may be made without departing from the spirit and scope of the invention(s) presently or hereafter claimed.

The invention claimed is:

1. A method to receive authorization to use programming, comprising:
   receiving at a mobile device, a first request command to use authorized programming;
   communicating a second request to use the authorized programming and program distribution account information from the mobile device to a program distributor;
   receiving at the mobile device, from the program distributor, authorization to use the authorized programming, the authorization conditioned on the communicated program distribution account information;
   communicating the authorization to a receiving device via the mobile device; and
   receiving the authorized programming at the mobile device from the receiving device.

2. The method of claim 1 wherein the authorization to use the authorized programming includes authorization to communicated the authorized programming to an authorized endpoint device.

3. The method of claim 1 wherein the authorized programming is authorized on a per use basis.

4. The method of claim 1 wherein the authorized programming is authorized for a future use.

5. The method of claim 1 wherein the act of receiving the first request command includes receiving input via a user interface integrated in the mobile device.

6. The method of claim 5 wherein the act of communicating the program distribution account information from the mobile device to the program distributor includes the act of entering information associated with the program distribution account information via the user interface integrated in the mobile device.

7. The method of claim 1 wherein the act of receiving the first request command includes receiving the first request from the receiving device.

8. The method of claim 1 wherein the act of communicating the program distribution account information from the mobile device to the program distributor includes retrieving the program distribution account information from an internal non-volatile memory of the mobile device.

9. A receiving device to distribute authorized programming, comprising:
   at least one memory configured to store authorized programming;
   at least one transceiver; and
   a processing system coupled to the at least one memory and the at least one transceiver, the processing system configured to operationally control the receiving device to perform the acts of:
   generating a request to use authorized programming;
   communicating the request via the at least one transceiver to a program distributor;
   receiving authorization to distribute the authorized programming; and
   distributing the authorized programming to at least two endpoint devices, the distribution conditioned on the receipt of the received authorization.

10. The receiving device of claim 9, comprising:
   a user interface coupled to the processing system, the user interface configured to receive information associated with the request to use authorized programming.

11. The receiving device of claim 9 wherein the at least one transceiver includes a wireless cellular transceiver integrated in the receiving device.

12. The receiving device of claim 9 wherein the act of communicating the request via the at least one transceiver to the program distributor includes:
   communicating the request through an associated mobile device.

13. The receiving device of claim 12 wherein the act of receiving authorization to distribute the authorized programming includes:
   receiving the authorization from the associated mobile device.

14. The receiving device of claim 9 wherein the processing system is configured to operationally control the receiving device to perform the act of:
   restricting distribution of the authorized programming from endpoint devices that are not authorized to receive the authorized programming.

15. The receiving device of claim 9 wherein one of the at least two endpoint devices is an Internet connectable TV.

16. A mobile device, comprising:
   a memory to store program distribution account information; and
   a mobile device programming authorization module configured to:
   receive a first request command to use authorized programming;
   communicate to a program distributor the program distribution account information;
   communicate to the program distributor a second request to use the authorized programming;
   receive an authorization from the program distributor, the authorization conditioned on the program distribution account information and the authorization permitting distribution of the authorized programming to at least two endpoint devices; and
   communicate the authorization to a receiving device.

17. The mobile device of claim 16 wherein the authorized programming is software configured for use by a game system and wherein at least one of the at least two endpoint devices is the game system.

18. The mobile device of claim 16, comprising:
   a user interface integrated in the mobile device, wherein the first request command is received via the user interface.

19. The mobile device of claim 18 information associated with the program distribution account information is received via the user interface integrated in the mobile device.

20. The mobile device of claim 18 the first request command is received from the receiving device.

* * * * *